W. E. BARNARD.
TYPE WRITING MACHINE.
APPLICATION FILED AUG. 19, 1909.
961,202.
Patented June 14, 1910.
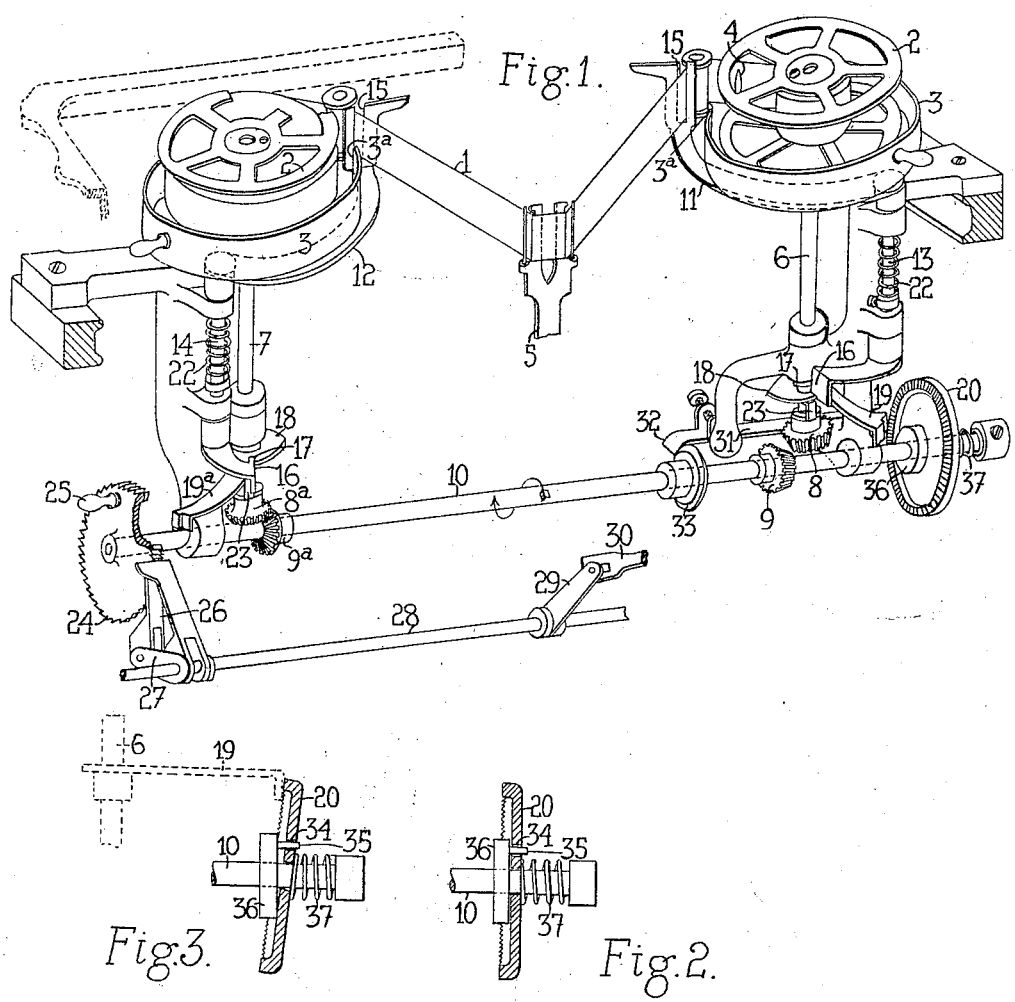
Witnesses:
John O. Seifert
Sigmund Schiff
Inventor:
Walter E. Barnard
By B. C. Stickney
Attorney:

UNITED STATES PATENT OFFICE.

WALTER E. BARNARD, OF HARTFORD, CONNECTICUT, ASSIGNOR TO UNDERWOOD TYPEWRITER COMPANY, OF NEW YORK, N. Y., A CORPORATION OF NEW JERSEY.

TYPE-WRITING MACHINE.

961,202. Specification of Letters Patent. Patented June 14, 1910.

Application filed August 19, 1909. Serial No. 513,550.

*To all whom it may concern:*

Be it known that I, WALTER E. BARNARD, a citizen of the United States, residing in Hartford, in the county of Hartford and State of Connecticut, have invented certain new and useful Improvements in Type-Writing Machines, of which the following is a specification.

This invention relates to an improvement in automatic ribbon reversing mechanism for typewriting machines, and more particularly to that style of ribbon reversing mechanism shown in Patent No. 828,548, dated August 14, 1906, to William F. Helmond. In this patent is disclosed a main winding shaft carrying crown wheels adapted to be alternately engaged by the respective feed reversing dogs or crowding members carried by the spool shafts, the operation of the feed reversing dogs being controlled by locking means automatically actuated in any suitable manner.

One object of the present invention is to provide means for preventing the main winding shaft from being locked against rotation by the engagement of both reversing dogs with the crown wheels at one time. As one means for accomplishing this purpose I preferably so arrange one of the crown wheels that it is capable of yielding action, and thus in the event that both reversing dogs are caused accidentally to engage their respective crown wheels, one at least of such wheels will yield to permit the rotation of the shaft. Moreover the teeth of the crown wheels or the pawls cannot be stripped or injured in attempts to rotate the shaft by hand when both reversing dogs are in engagement with the wheels.

In the accompanying drawings, Figure 1 is a perspective view illustrating one embodiment of the invention as applied to the ribbon mechanism of an Underwood front strike writing machine. Figs. 2 and 3 are detail cross sectional views showing the normal and abnormal positions of the yielding crown wheels.

The ribbon 1 is wound on the spools 2—2 received in cups 3—3, slotted as at 3ª, the ribbon being equipped near its ends with trips 4, passing through the slots in the cups and through the vibrator 5 intermediate the spools.

The spools are secured on spool shafts 6 and 7, such shafts carrying the beveled gears 8, 8ª, with which similar gears 9, 9ª on a horizontally extending winding shaft 10 are adapted to mesh alternately.

The shaft is equipped with a ratchet wheel 24 having a handle 25, for winding the ribbon manually when desired. A pawl 26 carried by a crank 27 on a rock shaft 28 engages the ratchet, the rock shaft being connected by a crank 29 to an arm 30 which vibrates at all key-strokes or spacing bar strokes.

In order to releasably maintain the longitudinally shiftable winding shaft in adjusted position, a spring detent 31 having a double beveled tooth 32 engages a double beveled collar 33 fixed on the winding shaft, it being understood that when the shaft is shifted the tooth rides across the periphery of the collar from one side to the other, against the spring tension.

Swinging arms 11 and 12 are carried by vertical shafts 13 and 14, journaled in the frame, the free ends of the arms being forked, as at 15, and arranged adjacent to the slots 3ª in the cups to receive the ribbon 1 and to be engaged by the respective trips 4. The shafts 13 and 14 are also equipped with latches 16, the free ends of which are normally received in notches 17 formed in hubs 18 mounted on the respective spool shafts, such hubs being provided with crowding members, as the dogs 19, 19ª adapted to engage feed reversing elements, as the crown wheel 20 and the ratchet wheel 24. The dogs are normally held out of engagement with the feed reversing elements by the latches 16 when entered in the notches 17; coiled springs 22 on the shafts 13 and 14 operating to yieldingly maintain the latches in their respective notches.

The hubs 18 are loose on the spool shafts but are frictionally connected therewith by means of friction washers 23, whereby the dogs 19 when released by the latches 16 may turn with the spool shafts.

In operation when the ribbon has nearly run off one spool, the trip at that end of the ribbon will be brought into engagement with the forked end of the adjacent arm 11 or 12, the continued feed of the ribbon operating to swing the arm against the tension of the coiled spring and cause the latch to release the dog which, turning with the spool, is brought into engagement with its crown or ratchet wheel to shift the winding shaft longitudinally.

The shifting of the winding shaft disengages the beveled gears 8 and 9 and meshes gears 8ᵃ, 9ᵃ, or vice versa, thereby reversing the ribbon travel.

It has been found that there is a possibility that both feed reversing dogs 19, 19ᵃ through inadvertence may be caused to be in engagement with their respective feed reversing elements at one time. As a result the winding shaft would be locked against rotation, thus preventing the ribbon from winding automatically at the usual operation of the keys; and if it should be attempted to forcibly rotate the shaft by hand, the teeth of the dogs or of the crown or ratchet wheel might be injured. This invention is directed to means whereby such disadvantages may be avoided. I therefore mount one of the feed reversing elements in such manner that it will yield when both elements are engaged by their respective crowding members. As one such means, I preferably provide at least one of the feed reversing elements, as the crown wheel 20 with an aperture 34 to receive a stud 35 carried by a collar 36 fast on the shaft 10. The crown wheel is loosely received on the shaft and is normally held in place against the collar with the stud 35 entered in the aperture, by a suitable yielding means, as a spring 37.

The opening through the crown wheel in which is received the winding shaft is of such size as to permit the wheel to be wabbled or forced over at an incline to its proper right angular position relative to the shaft, as shown in Fig. 3, but such movement of the wheel will not cause the stud to release the wheel, the stud being of such length as to engage the crown wheel no matter what position the latter may assume and retain the latter in fixed relation rotatively with the shaft. By this mechanism I, in effect, retain the crown wheel fixed on the shaft to partake of its rotary movement and at the same time permit the crown wheel to yield away from its dog 19.

The collar 36 serves as an abutment to limit the lateral play of the yielding feed reversing element in one direction, and the aperture 34 therein is of such size as to permit the feed reversing element to assume an oblique position relative to the shaft without binding on the stud.

In operation, assume that the ribbon has wound onto the spool carried by shaft 6, and that the trip on that end of the ribbon carried by the spool on shaft 7 is about to engage the fork 15 of the arm 12, the dog 19 being accidentally in engagement with its feed reversing member 20 and the gears 8 and 9 being in mesh. The engagement of the trip 4 with its forked arm 12 will release the latch 16 from engagement with the hub of the dog 19ᵃ. The continued rotation of the winding shaft will then cause the dog to swing against the face of its feed reversing element which is the ratchet wheel 24 in this instance, forcing the latter laterally. Since the ratchet is fast on the shaft, this imparts an endwise pull on the shaft to disengage the gears 8 and 9 and mesh the gears 8ᵃ and 9ᵃ whereby to reverse the direction of ribbon travel. The engagement of the dog 19 with the crown wheel 20, however, will prevent the latter from following with the shaft and therefore the crown wheel will be caused to assume the position shown in Fig. 3, the shaft 10 having been moved against the tension of the spring 37. The reversal of the ribbon feed is thus accomplished automatically and furthermore, injury to the teeth of the dogs and feed reversing wheels is prevented.

Having thus described my invention, I claim:

1. A ribbon-reversing mechanism comprising two coöperative reversing members, one of which is connected to rotate during the winding of the ribbon, and one of which is normally out of engagement with the other, and means dependent upon the movement of the ribbon to effect engagement of said reversing members, one of said reversing members being yieldingly mounted to prevent accidental stoppage of the ribbon-winding devices.

2. A ribbon mechanism comprising a wheel connected to rotate during the winding of the ribbon, a dog normally out of engagement with said wheel, and means dependent upon the movement of the ribbon to effect engagement of said dog with said wheel to reverse the travel of the ribbon, said wheel being yieldingly mounted to prevent accidental stoppage of the ribbon-winding devices.

3. A ribbon mechanism comprising two pairs of coöperative reversing members, one of each pair connected to rotate during the winding of the ribbon, one member of each pair normally out of engagement with its mate, means dependent upon the movement of the ribbon to effect engagement of the reversing members of each pair in alternation, one of the four reversing members being yieldingly mounted to prevent accidental stoppage of the ribbon-winding devices, as set forth.

4. A ribbon mechanism comprising two pairs of coöperative reversing members, each pair comprising a wheel connected to revolve during the winding of the ribbon, and a dog normally out of engagement with the wheel, and means dependent upon the movement of the ribbon to effect engagement of the dogs in alternation with their respective wheels, one of said wheels being yieldingly mounted to prevent accidental stoppage of the ribbon-winding devices, as set forth.

5. In a ribbon-reversing mechanism, the combination with a pair of ribbon spools, and a spool-winding shaft movable endwise to reverse the travel of the ribbon, of a pair of feed-reversing wheels upon said shaft, arms normally out of engagement with said feed-reversing wheels, means to cause said arms to swing alternately into engagement with said feed-reversing wheels to coöperate therewith to shift the shaft endwise, one of said wheels being mounted on said shaft to yield when in engagement with its arm to prevent the possibility of locking of the shaft by the simultaneous engagement of both arms with the wheels.

6. In a ribbon-reversing mechanism, the combination with a pair of ribbon spools, and a spool-winding shaft movable endwise to reverse the travel of the ribbon, of a pair of feed-reversing wheels upon said shaft, arms normally out of engagement with said feed-reversing wheels, means to cause said arms to swing alternately into engagement with said feed-reversing wheels to coöperate therewith to shift the shaft endwise, one of said wheels being mounted on said shaft to yield when in engagement with its arm to prevent the possibility of locking of the shaft by the simultaneous engagement of both arms with the wheels; said yielding wheel being loosely mounted on the shaft and pressed by a spring against a collar or shoulder provided upon the shaft, means being provided to cause the wheel to turn with the shaft.

7. In a ribbon-reversing mechanism, the combination with ribbon spools, spool shafts therefor, a rotary winding shaft shiftable to reverse the ribbon travel, crowding members, means for locking the crowding members in inoperative positions, and means for alternately releasing the locking means to permit the crowding members to move into operative positions, of feed-reversing elements carried by the winding shaft and lying in the paths of movement of the crowding members, one of the feed-reversing elements being mounted to yield when both elements are engaged by the crowding members at one time, to prevent a stoppage of the winding mechanism.

8. In a ribbon-reversing mechanism, the combination with a shiftable rotary winding shaft, spool-carrying shafts, means for transmitting motion from the winding shaft to the spool-carrying shafts, and crowding members, of a pair of feed-reversing elements normally alternately engaged by the crowding members to effect a reversal of the ribbon travel, one of the reversing elements having a flexible and rotative relation to the winding shaft to permit said element to yield when both crowding members are in engagement with their respective reversing elements.

9. In a ribbon-reversing mechanism, the combination with a shiftable rotary winding shaft, spool-carrying shafts, means for transmitting motion from the winding shaft to the spool-carrying shafts, and crowding members, of a pair of feed-reversing elements normally alternately engaged by the crowding members to effect a reversal of the ribbon travel, one of the elements being loosely mounted on the winding shaft, and means for retaining the element in rotative engagement with the winding shaft, and for permitting the element to yield when both reversing elements are engaged by their respective crowding members.

10. In a ribbon-reversing mechanism, the combination with a shiftable rotary winding shaft, spool carrying shafts, means for transmitting motion from the winding shaft to the spool carrying shafts, and crowding members, of a pair of feed-reversing elements normally alternately engaged by the crowding members to effect a reversal of the ribbon travel, one of the feed-reversing elements being loosely mounted on the shaft, means on the shaft engaging the element to cause it to rotate with the shaft, and means for yieldingly retaining the element in the path of movement of its crowding member.

11. In a ribbon-reversing mechanism, the combination with a shiftable rotary winding shaft, spool-carrying shafts, crowding members, and means for transmitting motion from the winding shaft to the spool-carrying shafts, of a pair of feed-reversing elements normally alternately engaged by the crowding members to effect a reversal of the ribbon travel, one of the feed-reversing elements being loosely mounted on the shaft, a collar fast on the shaft, means carried by the collar and engaging the element to cause it to rotate with the shaft, and means for yieldingly retaining the element in the path of movement of its crowding member.

12. In a ribbon-reversing mechanism, the combination with a shiftable rotary winding shaft, spool-carrying shafts, crowding members, and means for transmitting motion from the winding shaft to the spool-carrying shafts, of a pair of feed-reversing elements normally alternately engaged by the crowding members to effect a reversal of the ribbon travel, one of the feed-reversing elements being loosely mounted on the shaft, a connection between the shaft and feed-reversing element to maintain the latter in rotative relation with the shaft and permit it to move laterally relative thereto, and means for yieldingly retaining the element in the path of movement of its crowding member.

13. In a ribbon-reversing mechanism, the combination with a shiftable rotary winding shaft, spool-carrying shafts, means for transmitting motion from the winding shaft to the spool-carrying shafts, and crowding members, of a pair of feed-reversing elements on the winding shaft normally alternately engaged by the crowding members to effect a reversal of the ribbon travel, one of the feed-reversing elements being loosely mounted on the shaft, means on the shaft engaging the element to cause it to rotate with the shaft, and a spring on the winding shaft adapted to engage the element to yieldingly retain it in the path of movement of its crowding member.

14. In a ribbon-reversing mechanism, the combination with a shiftable rotary winding shaft, spool-carrying shafts, means for transmitting motion from the winding shaft to the spool-carrying shafts, and a pair of crowding members, of a pair of feed-reversing elements on the winding shaft normally alternately engaged by the crowding members to effect a reversal of the ribbon travel, one of the feed-reversing elements being loosely mounted on the shaft, a support on the winding shaft, and means for yieldingly retaining the element in engagement with the support and in the path of movement of its crowding member.

15. In a ribbon-reversing mechanism, the combination with a shiftable rotary winding shaft, spool-carrying shafts, means for transmitting motion from the winding shaft to the spool-carrying shafts, and crowding members, of a pair of disk-like feed-reversing elements mounted on the winding shaft and alternately engaged by their respective crowding members to effect a reversal of the ribbon travel, one of the feed-reversing elements being loosely received on the shaft, a collar fast on the shaft, a stud carried by the collar and receivable in an aperture in the disk-like element, and a spring engaging the loose feed-reversing element to maintain the stud in position in the aperture to permit the element to yield laterally when both crowding members are in engagement with their respective elements.

WALTER E. BARNARD.

Witnesses:
W. M. BYORKMAN,
LYMAN D. BROUGHTON.